United States Patent

Logan

[15] 3,664,983

[45] May 23, 1972

[54] 2-ACETOXY-4-OXA-ALKANESULFONATES, SYNTHETIC LATICES AND METHOD OF PREPARING SAME

[72] Inventor: Ted J. Logan, Colerain Twp., Hamilton, Ohio

[73] Assignee: The Procter & Gamble Company, Cincinnati, Ohio

[22] Filed: Feb. 2, 1971

[21] Appl. No.: 112,052

Related U.S. Application Data

[62] Division of Ser. No. 809,048, Mar. 20, 1969, abandoned.

[52] U.S. Cl.............260/29.7 SQ, 260/29.6 Z, 260/29.6 E, 260/29.6 MQ, 260/29.7 R, 260/513 R

[51] Int. Cl....................................C08d 7/18, C07c 143/02
[58] Field of Search..............260/29.6 Z, 29.6 E, 29.6 MQ, 260/29.7 SQ, 29.7 NQ, 513 R, 531, 535, 538, 557

*Primary Examiner*—Morris Liebman
*Assistant Examiner*—T. DeBenedictis, Sr.
*Attorney*—Richard C. Witte and Ronald L. Hemingway

[57] ABSTRACT

Compounds useful as surfactant compounds, 2-acetoxy-4-oxa-alkanesulfonates, are disclosed. The compounds, their method of preparation and use as detergents and emulsifiers are described. The compounds are particularly suited as emulsion polymerization surfactants in the emulsion polymerization of synthetic latices from vinylic monomers. The resulting latices are characterized by being low-foaming or non-foaming and find application in the preparation of adhesives foams, polishes, coatings and the like.

8 Claims, No Drawings

2-ACETOXY-4-OXA-ALKANESULFONATES, SYNTHETIC LATICES AND METHOD OF PREPARING SAME

This is a divisional of copending application Ser. No. 809,048, filed Mar. 20, 1969 and now abandoned.

This invention relates to 2-acetoxy-4-oxa-alkanesulfonates and their use as surfactant compounds. More particularly, it relates to 2-acetoxy-4-oxa-alkanesulfonates, their use as polymerization surfactants in the preparation of synthetic latices from vinylic monomers by aqueous emulsion polymerization and to methods of preparing synthetic latices.

Synthetic latices prepared by aqueous emulsion polymerization of monomers are well known and have become important in the preparation of adhesives, floor polishes, foams, synthetic rubbers and in the formulation of paints and coatings for textiles, leather, paper and the like. Synthetic latices suitable for such applications must be characterized by a balance of desirable properties.

Synthetic latices adaptable to application in the coating arts, for example, must be of controlled particle size and viscosity and must exhibit low-foaming properties. In addition, they should have high surface tension, superior chemical and mechanical stability, heat stability, freeze-thaw stability and pigment compatibility. Coatings prepared by the curing of such latices must be water and heat resistant and have adequate tensile strength, plasticization properties, clarity, grain, luster and smoothness.

Numerous attempts have been made in the prior art to formulate latices by emulsion polymerization from vinylic monomers having one or more of the aforementioned properties. A common approach to the preparation of such latices has been the employment of emulsifying agents which permit the production of latices exhibiting as great a number of the aforementioned properties as possible. While numerous emulsifying agents have been developed, serious deficiencies still exist, particularly with regard to the property of foaming. There has been a need for a class of emulsifying agents capable of exhibiting a balance of desirable properties including those of low-foaming tendency.

The tendency of latices to be either non-foaming or low-foaming is a desirable property which facilitates latex processing procedures and aids materially in the formation of high quality films or coatings. This property is especially advantageous in that it facilitates the formation of films which are substantially homogeneous and free of air bubbles and imperfections.

Excessive foaming during the processing and handling of latices is particularly bothersome in that it results in a loss of effective use of reaction vessels and containers. Latices exhibiting high foam levels require the use of larger reaction vessels than low-foaming latices for the processing of the same amount of latex. Similarly, the filling of tanks and drums is hampered by the propensity of latices to foam excessively.

The tendency of latices to foam or bubble during their application to substrates in the form of protective coatings results in a lower overall quality of coating than is generally desirable. Foaming or bubbling latices upon application to various materials such as wood, paper, metal or the like result in the production of non-uniform films owing largely to the formation of air bubbles of varying dimensions the formation of which results in the finished film having minute imperfections contributing to an overall generally undesirable appearance.

The propensity of latices to foam during preparation and application has resulted in the employment of antifoamants and/or defoamers in an attempt to facilitate the efficient processing and handling of latices and to improve the quality of coatings obtainable therefrom. The use of antifoamants to effectively minimize the formation of foam is subject to certain limitations, not the least of which is the tendency of many antifoamants to minimize foam formation at the expense of other desirable properties, e.g., water sensitivity and compatibility. Thus, there has been a need for emulsion polymerization surfactants capable of producing latices of superior properties.

It is an object of the present invention to provide emulsion polymerization surfactants suitable for the production of synthetic latices.

It is a further object of the present invention to provide emulsion polymerization surfactants suitable for the preparation of low-foaming or non-foaming synthetic latices from vinylic monomers.

It is another object of the present invention to provide low-foaming or non-foaming synthetic latices in the process for preparing same from vinylic monomers.

Other objects will become apparent from the consideration of the invention described in greater detail hereinafter.

SUMMARY OF THE INVENTION

This invention is based on the discovery that 2-acetoxy-4-oxa-alkanesulfonates are especially suited as emulsion polymerization surfactants in the preparation of low-foaming and non-foaming synthetic latices from vinylic monomers. The invention thus involves the 2-acetoxy-4-oxa-alkanesulfonates per se and synthetic latices containing the same. In its method aspect, the invention comprises polymerizing at least one vinylic monomer in an aqueous medium in the presence of an amount effective for emulsion polymerization of a 2-acetoxy-4-oxa-alkanesulfonate polymerization surfactant.

The 2-acetoxy-4oxa-alkanesulfonates of the present invention are characterized by the following formula

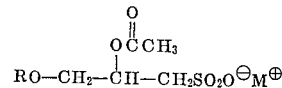

wherein R is alkyl of from about 10 to about 22 carbon atoms and M is a salt forming radical. These compounds are referred to herein as 2-acetoxy-4-oxa-alkanesulfonates, the recitation "4-oxa" referring to the presence of an ether oxygen as the fourth atom of an otherwise alkane chain.

As will be noted from the above-described structural formula, the polymerization surfactants utilizable herein are characterized by the presence of an anionic sulfonate moiety, a long-chain hydrophobic group interrupted by the presence of an oxygen ether atom and an acetoxy group, the acetoxy group being attached to a carbon atom beta- to the terminal sulfonate moiety. While the precise theory or mechanism according to which the surfactants of the present invention function to provide low-foaming synthetic latices is not completely understood, it is believed that the steric effect of the acetoxy group on the close packing of surfactant molecules is involved. It is also believed that the solubility of the 2-acetoxy-4-oxa-alkanesulfonates of the present invention in organic substances such as the vinylic monomers defined hereinafter is also a factor.

The tendency of the polymerization surfactants of the present invention to provide synthetic latices having low-foaming characteristics is believed to be a function both of the length of the hydrophobic moiety and the presence of the acetoxy group. When R in the above-described formula is alkyl of less than about 10 the low-foaming properties are not observed. When R is greater than about 22 the diminished solubility of the compounds in water reduces the efficiency of the polymerization reaction. Similarly, the preparation of low-foaming synthetic latices is not attained when alkanesulfonates not having a 2-acetoxy group are employed in the practice of the present invention. Preferred 2-acetoxy-4-oxa-alkanesulfonates are those corresponding to the hereinbefore described formula, wherein R is an alkyl group of about 12 to about 18 carbon atoms. These 2-acetoxy-4-oxa-alkanesulfonates are preferred from the standpoint of effectiveness in supporting low-foaming polymerization reactions.

The salt-forming radical M⁺ of the hereinbefore described structural formula can be, for example, an alkali metal cation (e.g., sodium, potassium, lithium), ammonium or a substituted-ammonium such as a quaternary ammonium cation. Specific examples of substituted-ammonium cations include methyl-, dimethyl-, trimethyl-, tetramethyl-ammonium cations and the like. Quaternary ammonium cations include dimethyl piperdinium cation and those derived from alkylamines such as ethylamine, diethylamine, triethylamine, mixtures thereof, and the like. The salt-forming radical serves to disperse the emulsion polymerization surfactant in the aqueous phase of the emulsion polymerization mixture. The salt-forming radical can be varied for compatibility with the polymerizable monomers, polymerization catalyst, pH and other additives. Preferred cations include sodium, potassium, lithium and ammonium for reasons that involve production and use of the surfactant.

The 2-acetoxy-4-oxa-alkanesulfonates of the present invention can be prepared by a process which involves acetylation of alkyl glyceryl sulfonates according to the following scheme:

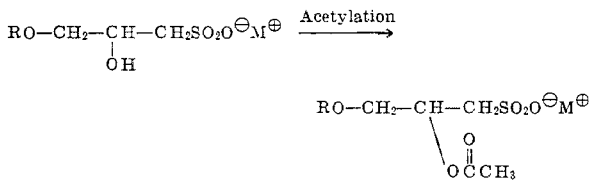

where R and M are as hereinbefore described.

The alkyl glyceryl sulfonates which are characterized by the presence of a hydroxy group on the carbon atom adjacent to the carbon atom containing the sulfonate moiety are known compounds which can be acetylated in a known manner. For example, the alkyl glyceryl sulfonates can be acetylated by reaction with acetic anhydride and pyridine or with ketene, acetyl chloride or isopropenyl acetate. The reaction temperature will depend upon the particular acetylating agent employed and the desired reaction time and can range from about 0° to about 100° C. The acetylation reaction can be conducted at atmospheric pressure or under reduced or super atmospheric conditions of pressure. The molar ratio of alkyl glyceryl sulfonate and acetylating agent can range from a slight molar deficiency of the acetylating agent to an excess of acetylating agent with respect to the amount of alkyl glyceryl sulfonate employed. Suitable molar ratios of acetylating agent to alkyl glyceryl sulfonate are from about 0.8:1 to about 10:1. A preferred ratio is from about 1:1 to about 3:1, a slight molar excess of acetylating agent being especially suitable. The reaction time will depend upon the reaction temperature and type of acetylating agent employed. While best results are achieved at higher temperatures in a short period of time, the reaction time can vary from about 1 to about 12 hours.

Catalysts can be employed in the conduct of the acetylating reaction. Suitable catalysts include pyridine and trimethylamine and are employed depending on the nature of the acetylating agent which is utilized.

A preferred process for preparing the compounds of the present invention comprises reacting an alkyl glyceryl sulfonate salt, preferably an alkali metal salt, with isopropenyl acetate at a temperature of about 0° to about 75° C. Isopropenyl acetate is a preferred acetylating agent herein from the standpoint of facility of reaction, and ease in removing the acetone co-product from the desired product by evaporation or other suitable methods.

The alkyl glyceryl sulfonates employed as the starting materials in the reaction with acetylating agent to produce the acetylated derivatives of the present invention are known compounds and are described, for example, in U.S. Pat. No. 3,024,273 (Mar. 6, 1962) incorporated herein by reference. These alkyl glyceryl sulfonates can be prepared by reaction of an alcohol of from about 10 to about 22 carbon atoms and epi-chlorohydrin followed by reaction with an alkali metal sulfite. The alcohols employed in the reaction with epi-chlorohydrin are those having from about 10 to about 22 carbon atoms and include the "middle-cut" coconut fatty alcohols, and the fatty alcohols derived from unhydrogenated tallow. When these alcohols are employed, the resulting glyceryl sulfonates will include alkenyl glyceryl sulfonates reflecting the presence of unsaturation in the alcohols employed. Consequently, the term alkyl as employed herein is to be understood to include within its scope the alkenyls as well as the true alkyls. Palm oil, hydrogenated marine oil, the latter containing some fatty acids having 20 to 22 carbon atoms in the alkyl chain, and oxo alcohols, made by reacting carbon monoxide and hydrogen with olefins, also represent available fatty alcohol sources which can be employed in the preparation of suitable alkyl glyceryl sulfonate starting materials.

An alternative method of preparing the alkyl glyceryl sulfonate starting materials described herein involves reaction of an alkali metal sulfite with an alkyl ether of glycidol wherein the alkyl has from about 10 to about 22 carbon atoms. The reaction of alkali metal sulfites with epoxides such as alkyl ethers of glycidol is known and is described, for example, in U.S. Pat. No. 2,925,316 (Feb. 16, 1960). This patent is hereby incorporated by reference.

Depending upon the process by which such starting materials are prepared they will contain, in addition to the monoglyceryl ether described, certain dimeric and trimeric products. For example, the use of an excess of epichlorohydrin in the reaction with alcohol in accordance with the process disclosed in U.S. Pat. No. 3,024,273 will result in the production of chloroglyceryl ethers in which the glyceryl radical is replaced in part with polyglyceryl radicals, e.g., with two or three condensed glyceryl radicals. The amounts of these components in the predominantly monoglyceryl product can be readily adjusted by regulating the relative proportions of epi-chlorohydrin and alcohol used to obtain the alkyl glyceryl sulfonate mixture. If desired, the dimeric and trimeric products can be separated by distillation. It is preferred, however, from the standpoint of convenience to employ the alkyl glyceryl sulfonates of the invention in admixture with minor amounts of dimeric and trimeric products, since there is no particular advantage in the preparation and isolation of only the monoglyceryl form of said alkyl glyceryl sulfonates.

Normally, the 2-acetoxy-4-oxa-alkanesulfonates are prepared in the form of their sodium or potassium salts. Consequently, if it is desired to have salts other than the sodium or potassium salts of the 2-acetoxy-4-oxa-alkanesulfonates, such as the ammonium or alkylol-substituted ammonium salts, the sodium salt, for example, can be passed over an ion exchange resin to replace the sodium ion with a hydrogen ion and the resulting acid can then be neutralized with ammonia, or alkylol-substituted ammonia, e.g., the mono-, di- or triethanolamines or propanolamines.

Specific examples of 2-acetoxy-4-oxa-alkanesulfonates utilizable herein particularly in the formation of synthetic latices characterized by low-foaming properties include sodium 2-acetoxy-4-oxa-tetradecanesulfonate; potassium 2-acetoxy-4-oxa-hexadecanesulfonate; sodium 2-acetoxy-4-oxa-octadecanesulfonate; potassium 2-acetoxy-4-oxa-nonadecanesulfonate; lithium 2-acetoxy-4-oxa-eicosanesulfo-nate; sodium 2-acetoxy-4-oxa-uncosanesulfonate; ammonium 2-acetoxy-4-oxa-docosanesulfonate; sodium 2-acetoxy-4-oxa-tricosanesulfonate; dimethylammonium 2-acetoxy-4-oxa-tetracosanesulfonate; potassium 2-acetoxy-4-oxa-pentacosanesulfonate; dimethylpiperdinium 2-acetoxy-4-oxa-hexacosanesulfonate; sodium 2-acetoxy-4-oxa-eicosanesulfonate; potassium 2-acetoxy-4-oxa-docosanesulfonate; sodium 2-acetoxy-4-oxa-tetracosanesulfonate; sodium 2-acetoxy-4-oxa-hexacosanesulfonate; and isomers thereof.

The synthetic latices of the present invention can be prepared by emulsion polymerization of vinylic monomers and mixtures of vinylic monomers. According to the process of the present invention, homopolymers and copolymers (including terpolymers) are provided by effecting the aqueous emulsion polymerization of one or more vinylic monomers in the presence of an amount effective for emulsion polymerization of a 2-acetoxy-4-oxa-alkanesulfonate hereinbefore described. As employed herein in the specification and claims, the term vinylic monomer contemplates ethylenically unsaturated polymerizable monomers characterized by the presence of the

group. Normally, at least one of the disconnected valences is attached to an electroactive group, i.e., a group which substantially increases the electrical dissymmetry or polar character of the molecule. Examples of vinylic monomers and mixtures of monomers utilizable herein include the following:
1. Styrene, chloro-substituted styrenes, and methylsubstituted styrenes, mixtures thereof, and mixtures with other monomers such as butadiene, acrylonitrile, acrylic acid, methacrylic acid and the like.
2. Vinyl chloride, vinyl acetate, and vinylidene chloride, mixtures thereof, and mixtures with other monomers such as acrylonitrile, butyraldehyde, ethylene, methyl methacrylate, butadiene, isobutylene, maleic esters such as diethyl maleate and dibutyl maleate, and the like.
3. Acrylonitrile, methacrylonitrile, and mixtures thereof with butadiene, isobutylene, vinylidene chloride, chloroprene, maleic esters such as diethyl maleate and dibutyl maleate, and the like.
4. Acrylates such as methyl acrylate, methyl methacrylate, phenyl methacrylate, tertiary amyl methacrylate, 2-ethylhexyl methacrylate, mixtures thereof, and mixtures for example, with styrene, 2-methyl styrene, butadiene, acrylonitrile, acrylic acid, methacrylic acid, and vinyl acetate.
5. Butadienes, particularly, the 1,3-butadienes such as 2-methyl-1,3-butadiene (isoprene); piperylene; 2,3-dimethylbutadiene-1,3, mixtures thereof, and mixtures with styrene, 2-methyl styrene, acrylonitrile, methyl methacrylate, ethyl acrylate, vinyl naphthalene, methacrylamide, vinylidene chloride, methyl vinyl ether, methyl vinyl ketone, acrylic acid, methacrylic acid and the like.
6. Chloroprene and other 2-halo-butadienes, such as the analogs and homologues of chloroprene; 2,3-dichloro-1,3-butadiene; mixtures thereof, and mixtures with styrene, acrylonitrile, and the like.

Particularly preferred monomers or monomer mixtures are vinyl acetate, vinyl chloride, butadiene-styrene, and the acrylics, particularly mixtures with vinyl acetate such as vinyl acetate- ethyl acrylate, vinyl acetate-2-ethyl hexyl acrylate, vinyl acetate-dibutyl maleate, vinyl acetate-acrylate ester-acrylic acid, vinyl acetate-acrylate ester-methacrylic acid, vinyl acetate-acrylate ester-itaconic acid, vinyl acetate-acrylamide, and vinyl acetate-methylol acrylamide; these being preferred by reason of their adaptability to a variety of coating and adhesive applications.

It will, of course, be appreciated that the aforedescribed monomers and mixtures of monomers are described by way of example only and represent those materials which are generally known and available and which undergo emulsion polymerization. Likewise other vinylic monomers other than those specifically enumerated can be polymerized in the presence of a 2-acetoxy-4-oxa-alkanesulfonate polymerization surfactant to provide synthetic latices having low-forming properties.

The production of synthetic latices in accordance with the present invention is effected by polymerizing a vinylic monomer or mixture of monomers in an aqueous medium in accordance with polymerization methods known in the art. The monomer or monomers utilizable herein can be polymerized by forming an aqueous emulsion of the vinylic monomer or mixture of monomers and 2-acetoxy-4-oxa-alkanesulfonate and initiating polymerization with a polymerization initiator of the conventional free-radical-forming type. While the polymerization reaction can be effected in accordance with a batch technique whereby a premixed emulsion of monomer or mixture of monomers of the oil-in-water type is polymerized with a polymerization initiator, the polymerization reaction can also be effected by the continuous or delayed addition of monomer or monomers to an initiated system.

The emulsion polymerization of the present invention can be conducted over a wide range of temperatures depending upon the particular monomers being polymerized. Suitable temperatures for effecting the polymerization range from about −10° C. to about 180° C. Preferably, the polymerization is conducted at a temperature of about 25° C. to about 100° C. In the case of the homopolymerization of styrene, for example, the polymerization reaction is conducted at a temperature of about 25° C to about 70° C . The amount of 2-acetoxy-4-oxa-alkanesulfonate surfactant employed herein in the preparation of emulsions polymerizable to form synthetic latices of the hereinbefore described type varies with the nature of monomer or monomers employed in the polymerization. A small amount sufficient to form an aqueous emulsion of polymerizable monomers, and corresponding to about 0.5 to 5 percent by weight of the monomer or mixture of monomers employed, can be utilized herein. Preferably, an amount of about 0.7 to about 2.5 percent of the 2-acetoxy-4-oxa-alkanesulfonate is employed.

The relative proportions of co-monomers employed in the preparation of copolymers will vary depending upon the particular properties desired in the polymer. The 2-acetoxy-4-oxa-alkanesulfonates of the invention permit the preparation by emulsion polymerization of a wide range of products as to composition and properties with a correspondingly wide range of end uses. In the preparation of styrene-butadiene latices suitable for the preparation of latex paints, for example, a ratio in parts by weight of styrene to butadiene of about 0.8:1 to about 4:1, and preferably about 1.5:1 to about 3:1 is employed. Similarly, emulsion polymerization of a mixture of about 0.25:1 to about 5:1, respectively, of lower alkyl acrylates, e.g. butyl acrylate and lower alkyl methacrylates, e.g. methyl methacrylate, provide latices adapted to use in the preparation of water-based adhesives, foamed carpet backings, water-based latex paint formulations and the like.

The amount of water employed in the emulsion polymerization process herein varies with the solids content desired for the final latex and can be varied to provide latices ranging from liquid to salve-like or gel consistency. Preferably, about 30 to about 400 parts of water by weight are used per 100 parts of monomer mixture. The resulting latices are aqueous compositions having solids contents of from about 20 percent to about 75 percent.

The polymerization reaction can be conducted in a reaction vessel provided with stirring means and an external means of supplying or removing heat. Normally, the polymerization is conducted by charging an initially prepared monomeric emulsion to the reaction vessel and raising the temperature, adding a polymerization initiator with stirring and allowing the reaction to continue until substantial conversion of monomer to polymeric latex has taken place. In accordance with the present invention, the employment of a 2-acetoxy-4-oxa-alkanesulfonate facilitates the efficient processing of latex in that the level of foam resulting from agitation is minimized and the reactive capacity of the reaction vessel employed is maximized. The presence of 2-acetoxy-4-oxa-alkanesulfonate as an integral part of the latex particles serves also to minimize foam formation subsequent to completion of polymerization, i.e., during subsequent agitation, shaking, pumping, application to a substrate or the like.

Suitable polymerization initiators or catalysts include conventional free radical-generating initiators such as the "per" compounds. Examples include inorganic and organic peroxides and per-salts such as benzoyl peroxide, benzoyl acetyl peroxide, lauryl peroxide, tertiary butyl perbenzoate, peracetic acid, acetyl peroxide, hydrogen peroxide, tertiary butyl hydroperoxide, sodium peroxide, barium peroxide, potassium persulfate, percarbonate or perborate. Two or more such initiators can be employed if desired. When the polymerization is conducted at temperatures below reflux, initiators of the redox type can be used, e.g., potassium persulfate with sodium bisulfite, hydrogen peroxide with ferrous sulfate, hydrogen peroxide with ferric sulfate and sodium pyrophosphate. Certain azo derivatives, e.g., 2,2'-azodiisobutyronitrile are also useful. The initiator should be employed in an amount of about 0.01 to 1.0 percent by weight of the monomer or mixture of monomers employed in the polymerization reaction.

The range of pH of the emulsion polymerized in accordance with the present invention can be regulated with the aid of a buffering agent. Normally, the polymerization reactions conducted in accordance with the present invention are conducted at pH's between 2 and 11 and any water-soluble buffering agent which will maintain the pH of the emulsion within this range can be employed.

Typical of the buffering agents which can be employed are such compounds as sodium carbonate, potassium carbonate, ammonium carbonate, sodium acetate, potassium acetate, sodium bicarbonate, sodium phosphate, potassium phosphate, ammonium phosphate, sodium tetraborate, potassium tetraborate and the like. These compounds can be employed individually or in combination.

In like manner, any of the conventional regulators (e.g., diisopropyl xanthate, octylmercaptan), stabilizers (e.g., gelatin, carboxymethyl cellulose), activators (e.g., ferrous ion and $AgHSO_3$; $NaHSO_3$ or $Na_2S_2O_4$), electrolytes (e.g., KCl, $KNO_3$) or the like can be employed herein to advantage.

The synthetic latices prepared according to the present invention are characterized herein as being non-foaming or low-foaming. The foaming propensities of synthetic latices can be determined conveniently by a number of methods. A simple method of determining relative degrees of foaming involves visual observation of a latex subsequent to vigorous shaking. Another suitable means involves mechanical stirring of the latex and observation of increased volume. Such a method is illustrated hereinafter.

Synthetic latices prepared in accordance with the present invention are fine aqueous dispersions of polymeric particles ranging from light viscous liquids to pasty masses of salve-like consistency depending largely on the amount of water employed in the polymerization reaction and the particular monomers polymerized. The polymers prepared in accordance with the present invention can be cured or dried to form films making them adaptable as vehicles for coating or paint compositions for a variety of substrates. They can be compounded with suitable pigments, resinous materials, fillers, thickening agents, plasticizers, stabilizing agents or the like for use in these applications. In addition, certain of the latices herein can be employed in the preparation of floor polishes, adhesives, foamed polymeric articles, carpet backings and the like.

The 2-acetoxy-4-oxa-alkanesulfonates of the present invention in addition to being useful as emulsion polymerization surfactants, have excellent wetting and cleansing properties. These compounds are readily soluble in water and can be employed generally in situations where a powerful wetting, washing or dispersing agent is desired. For example, they can be used as detergent actives in the cleansing of textile materials as well as hard surfaces. When so employed, they can be admixed with any of the known inorganic or organic builder compounds normally employed in the detergency arts. Suitable water-soluble alkaline builders include sodium tripolyphosphate and sodium pyrophosphate. The compounds of the present invention also demonstrate solubility in organic solvents such as perchloroethylene, chloroform, ethanol and trichloroethylene. The solubility of these compounds in organic solvents is in marked contrast to that of conventional anionic surfactant materials. For example, the alkali metal salts of alkylbenzene sulfonates and alkyl sulfates while excellent detergent compounds from the standpoint of efficient soil-removal are not appreciably soluble in perchloroethylene. The solubility of the 2-acetoxy-4-oxa-alkanesulfonates herein in the organic solvents of the hereinbefore classes renders them of special value in the formulation of organic dry-cleaning compositions.

Suitable organic dry-cleaning compositions contain a major amount, from about 95 to about 98 percent of an organic solvent such as carbon tetrachloride, trichloroethylene, perchloro-ethylene and Stoddard solvent, and from about 0.2 percent to about 5 percent, and preferably 0.25 to 1 percent, of a 2-acetoxy-4-oxa-alkanesulfonate of the invention.

The following examples are given in illustration and are not intended as limitations on the scope of this invention. Where parts are mentioned, they are parts by weight.

EXAMPLE I

Into a 2-liter, three-necked, round bottom flask was placed 160 g. of coconut-tallow alkyl glyceryl sulfonate of the formula

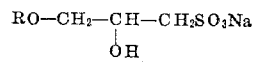

(R being derived from an admixture of coconut and tallow alcohol having a chain length distribution of $C_{12}$ to about $C_{18}$), 1,500 g. of isopropenyl acetate, and 15 g. of p-toluene sulfonate acid. The contents of the reaction flask were refluxed (92° C.) for 5 hours. The solution was cooled to 10° C. and the precipitated solid was filtered and boiled in 800 ml. of refluxing acetone. The solution was cooled to 5° C. and filtered in a dry box to give 133 g. of product. Infrared analysis identified the product as sodium 2-acetoxy-4-oxa-coconut-tallow-alkanesulfonate, indicating conversion of hydroxy to acetoxy groups.

Substantially similar results are obtained when the mixed coconut-tallow alkyl glyceryl sulfonate is replaced with the following alkyl glyceryl sulfonates in that the 2-hydroxy group is replaced by an acetoxy group: the sodium salt of tallow-alkyl glyceryl sulfonate; the potassium salt of coconut-alkyl glyceryl sulfonate.

Substantially similar results can be obtained when the isopropenyl acetate employed in the above example is replaced with the following acetylating agents, in that acetylation of the hydroxy group takes place: acetyl chloride, ketene or acetic anhydride.

EXAMPLE II

Into a 12-liter flask equipped with a reflux condenser and thermometer were added 700 g. of sodium 2-hydroxy-4-oxa-docosanesulfonate, $C_{18}H_{36}O-CH_2-CH(OH)CH_2SO_3Na$, 7 liters of isopropenyl acetate and 28 ml. of concentrated sulfuric acid. The contents of the reaction vessel were heated to reflux temperature and allowed to reflux for four hours. The reflux reaction product was cooled and precipitation of crystals was observed. The precipitated product was filtered, washed with acetone, and dried. Infrared analysis identified the product as sodium 2-acetoxy-4-oxa-docosane-sulfonate and indicated an absence of hydroxyl bonds, i.e., conversion of the hydroxy groups to acetoxy groups.

Substantially similar results can be obtained when the following 2-hydroxy-4-oxa-alkanesulfonate salts are employed in place of sodium 2-hydroxy-4-oxa-docosanesulfonate in that the corresponding 2-acetoxy derivatives are obtained: sodium 2-hydroxy-4-oxa-tetradecanesulfonate; potassium 2-hydroxy-4-oxa-hexadecanesulfonate; sodium 2-hydroxy-4-oxa-octadecanesulfonate; potassium 2-hydroxy-4-oxa-nonadecanesulfonate; lithium 2-hydroxy-4-oxa-eicosanesulfonate; sodium 2-hydroxy-4-oxa-uncosanesulfonate; ammonium 2-hydroxy-4-oxa-docosanesulfonate; sodium 2-hydroxy-4-oxa-tricosanesulfonate; dimethylammonium 2-hydroxy-4-oxa-tetracosanesulfonate; potassium 2-hydroxy-4-oxa-pentacosane-sulfonate; dimethylpiperdinium 2-hydroxy-4-oxa-hexacosane-sulfonate; sodium 2-hydroxy-4-oxa-icosanesulfonate; potassium 2-hydroxy-4-oxa-docosanesulfonate; sodium 2-hydroxy-4-oxa-tetracosanesulfonate; and isomers thereof.

EXAMPLE III

To 642 g. (1.7 moles) of sodium 2-hydroxy-4-oxa-eicosanesulfonate was added 5 liters of isopropenyl acetate (solvent and reactant) and 20 ml. of concentrated sulfuric acid (catalyst) in a three-necked, 12-liter, round-bottom flask equipped with a reflux condenser, mechanical stirrer and thermometer. The resulting heterogeneous mixture was heated to reflux (80° C. to 90° C.) for 5 hours, during which time the mixture became homogeneous and slightly brown in color. Upon cooling, the product precipitated from solution, and was then filtered, washed several times with acetone, and allowed to dry in air. The total of 515 g. (68 percent yield) of product resulted. Infrared analysis showed that the hydroxyl group of the starting material had been converted to the desired acetoxy group, i.e., that the desired product 2-acetoxy-4-oxa-eicosanesulfonate was obtained.

EXAMPLE IV

A stable, low-foaming latex was prepared from the following ingredients, the emulsion polymerization surfactant being that of Example III:

| Components | Parts by Weight |
| --- | --- |
| Butyl acrylate | 60 |
| Methyl methacrylate | 40 |
| $K_2S_2O_8$ | 0.2 |
| Sodium 2-acetoxy-4-oxa-eicosanesulfonate | 6 |
| Water | 106 |

A monomer emulsion was prepared by admixing 85 parts of the ionized water, 60 parts butyl acrylate, 40 parts methyl methacrylate, 0.2 parts $K_2S_2O_8$, and 6 parts sodium 2-acetoxy-4-oxa-eicosanesulfonate. To a 500 ml. three-necked flask equipped with a reflux condenser, thermometer and stirring means, was added 21 parts of water and an equivolume amount of the prepared emulsion. The contents of the reaction vessel were heated in a water bath and refluxing began at a temperature of 82° C., the temperature rising to 90° C. in about 8 minutes. When the refluxing subsided the remaining amount of monomer emulsion was added slowly over a period of 1.5 hours with refluxing at a temperature of 88°–94° C. Upon completion of the addition of monomer emulsion the temperature was raised to 97° C. to complete polymerization. The reaction vessel was cooled to room temperature with stirring and the contents were strained through a 100-mesh wire screen. The latex which comprised 47.8 percent solids had a viscosity at 25° C. of 1590 centipoises at a pH of 4.0. The latex was evaluated for reactor coagulum and mechanical stability according to the hereinafter described tests. Reactor coagulum was less than 0.1 percent and coagulum after testing for mechanical stability was about 1 percent. The latex did not foam upon vigorous shaking.

Substantially similar results can be obtained when the following emulsion polymerization surfactants are employed in place of all or part of the sodium 2-acetoxy-4-oxa-eicosanesulfonate, in that low-foaming latices are obtained: sodium 2-acetoxy-4-oxa-tetradecanesulfonate; ammonium 2-acetoxy-4-oxa-pentadecanesulfonate; potassium 2-acetoxy-4-oxa-hexadecanesulfonate; sodium 2-acetoxy-4-oxa-heptadecanesulfonate; sodium 2-acetoxy-4-oxa-octadecanesulfonate; potassium 2-acetoxy-4-oxa-nonadecanesulfonate; lithium 2-acetoxy-4-oxa-eicosanesulfonate; sodium 2-acetoxy-4-oxa-uncosanesulfonate; ammonium 2-acetoxy-4-oxa-docosanesulfonate; sodium 2-acetoxy-4-oxa-tricosanesulfonate; dimethylammonium 2-acetoxy-4-oxa-tetracosanesulfonate; potassium 2-acetoxy-4-oxa-pentacosanesulfonate; dimethylpiperdinium 2-acetoxy-4-oxa-hexacosanesulfonate; sodium 2-acetoxy-4-oxa-docosanesulfonate; potassium 2-acetoxy-4-oxa-docosanesulfonate; sodium 2-acetoxy-4-oxa-hexacosanesulfonate; and isomers thereof.

EXAMPLE V

A stable, low-foaming latex was prepared from the following ingredients employing the product of Example II as an emulsion polymerization surfactant:

| Components | Parts by Weight |
| --- | --- |
| Butyl acrylate | 120 |
| Methyl methacrylate | 80 |
| $K_2S_2O_8$ | 0.4 |
| Sodium 2-acetoxy-4-oxa-docosanesulfonate | 10 |
| Water | 210 |

A monomer emulsion was prepared by admixing 168 parts of the ionized water, 120 parts butyl acrylate, 80 parts methyl methacrylate, 0.4 parts $K_2S_2O_8$, and 10 parts sodium 2-acetoxy-4-oxa-docosanesulfonate. To a 500-ml. three-necked flask equipped with a reflux condenser, thermometer and stirring means, was added 42 parts of water and an equivolume amount of the prepared emulsion. The contents of the reaction vessel were heated in a water bath and heated to reflux temperature. When the refluxing subsided, the remaining amount of monomer emulsion was added slowly over a period of 1.5 hours with refluxing at a temperature of about 88°–94° C. Upon completion of the addition of monomer emulsion the temperature was raised to complete polymerization. The reaction vessel was cooled to room temperature with stirring and the contents were strained through a 100-mesh wire screen. The latex which comprised 49 percent solids had a viscosity at 25° C. and a pH of 3.5 of 700 centipoises. Reactor coagulum was less than 0.4 percent and coagulum after the mechanical stability test was about 2 percent. The latex did not foam upon vigorous shaking.

Substantially similar results are obtained when the following acrylates, methacrylates, acids or mixtures thereof are polymerized in like manner in that low-foaming latices are obtained: methyl acrylate, ethyl acrylate, isobutyl methacrylate, phenyl methacrylate, tertiary amyl methacrylate, 2-ethylhexyl methacrylate, acrylic acid, methacrylic acid.

EXAMPLE VI

A stable, non-foaming latex is prepared from the following materials:

| Components | Parts by Weight |
| --- | --- |
| Butadiene | 40 |
| Styrene | 60 |
| Sodium 2-acetoxy-4-oxa-eicosanesulfonate | 6 |
| $K_2S_2O_8$ (as 0.17 M solution) | 6 |
| KCl (as 4 M solution) | 8 |
| Water | 110 |

The polymerization reaction is conducted in a 32-oz. beverage bottle fitted with a nitrile-butyl rubber septum adapted to addition or removal of fluid by means of a hypodermic syringe. Deionized, deaerated water, freshly distilled styrene and KCl are charged into the beverage bottle. The sodium 2-acetoxy-4-oxa-eicosanesulfonate is added and the bottle is capped as described above. The bottle is sparged with nitrogen and butadiene is added. The $K_2S_2O_8$ initiator solution is introduced by aid of a syringe and the bottle is rotated at 24 rpm, end-over-end, at 122° F. until completion of polymerization. The polymerization reaction proceeds with a low order of foam formation. The resulting latex when shaken vigorously produces very little foam.

Substantially similar results are obtained in that stable low-foaming latices are prepared when styrene is replaced by a methyl styrene, a chloro-styrene or mixture thereof. Similarly, butadiene can be replaced by acrylonitrile, methacrylonitrile, acrylic acid, methacrylic acid or mixtures thereof.

EXAMPLE VII

A smooth, low-foaming, stable latex is provided by polymerization of the following ingredients:

| Component | Parts by Weight |
| --- | --- |
| Vinyl chloride | 300 |
| Potassium 2-acetoxy-4-oxa-tetracosanesulfonate | 8 |
| $K_2S_2O_8$ | 2 |
| Water | 600 |

The polymerization (substantially 100 percent conversion) is effected by introducing the deionized water, the potassium 2-acetoxy-4-oxa-tetracosanesulfonate and $K_2S_2O_8$ into a high-pressure reaction vessel adapted with stirring means, sparging with nitrogen and introducing the vinyl chloride monomer. The ingredients are allowed to react in the closed reactor at a temperature of 60° C. for 50 minutes. The reaction mass is agitated during the reaction by means of an agitator rotating at 300 rpm. Substantially no foam is generated during the reaction. The resulting latex when agitated by stirring or vigorous shaking is substantially non-foaming.

Substantially similar results are obtained when vinylidene chloride is employed in lieu of vinyl chloride in that a low-foaming, stable latex is formed.

EXAMPLE VIII

A vinyl acetate fluid, low-foaming latex is prepared by polymerization of the following ingredients:

| Components | Parts by Weight |
| --- | --- |
| Vinyl acetate | 100 |
| Sodium bicarbonate (as 1% aqueous solution) | 10 |
| $K_2S_2O_8$ (as 1% aqueous solution) | 30 |
| Ammonium 2-acetoxy-4-oxa-tricosanesulfonate | 2.5 |
| Water | 100 |

To a suitable reaction vessel is added the ammonium 2-acetoxy-4-oxa-tricosanesulfonate, the sodium bicarbonate solution, the required amount of water and the vinyl acetate.

The mixture is then purged with nitrogen below its surface for 5 to 10 minutes. Following the purge, the potassium persulfate solution is added and the reaction vessel is capped securely. Thereafter the vessel containing the reaction mixture is placed in rotating holders in a water bath heated to 52° C. and is reacted at this temperature for 15 to 20 hours while slowly rotating the reaction vessel holders to achieve agitation of the reaction mixture. Following reaction, the reaction vessel is removed, cooled, and the resulting polymer latex is filtered to remove any coagulum.

Substantially similar results are obtained when part of the vinyl acetate is replaced with methyl methacrylate, diethyl maleate, vinyl chloride or vinylidene chloride.

EXAMPLE IX

A smooth, low-foaming latex is provided by polymerizing the following ingredients:

| Components | Parts by Weight |
| --- | --- |
| Vinyl chloride | 50 |
| Isobutylene | 33 |
| Water (deionized) | 150 |
| Lithium 2-acetoxy-4-oxa-hexadecanesulfonate | 4 |
| Potassium persulfate | 0.5 |

The vinyl chloride and isobutylene are admixed at about −50° C., the mixture is added to a closed reactor or bomb together with the other ingredients and reacted at 60° C. for 100 hours while being continuously agitated. The resulting latex has highly desirable properties.

Substantially similar results are obtained in that a stable low-foaming latex is obtained when the following are employed in lieu of isobutylene: acrylonitrile, methyl methacrylate, butadiene, diethyl maleate, dibutyl maleate or mixtures thereof.

EXAMPLE X

A fluid, stable, low-foaming latex is prepared from the following materials:

| Components | Parts by Weight |
| --- | --- |
| Acrylonitrile | 140 |
| Butadiene | 400 |
| Potassium 2-acetoxy-4-oxa-eicosanesulfonate | 12 |
| Hydrogen peroxide (as 15% solution) | 20 |
| Water (deionized) | 970 |

To a solution of the potassium 2-acetoxy-4-oxa-eicosanesulfonate in water in a beverage bottle reaction vessel are added the acrylonitrile, the hydrogen peroxide and butadiene in turn. The butadiene is added after capping with the aid of a syringe, the beverage bottle is sparged with nitrogen and the polymerization is conducted in the capped bottle at about 40° C. for about 15 hours with agitation. Substantially similar results can be obtained when butadiene is replaced by isobutylene or when acrylonitrile is replaced by methacrylonitrile in that a low-foaming, stable latex is obtained.

EXAMPLE XI

Chloroprene is polymerized to a stable, smooth latex from the following ingredients:

| Components | Parts by Weight |
| --- | --- |
| Chloroprene | 100 |
| Tertiary dodecyl mercaptan | 0.40 |
| Water (deionized) | 100 |
| Ammonium 2-acetoxy-4-oxa-tetracosanesulfonate | 2.6 |

The chloroprene is admixed with a solution of the emulsifier and tertiary dodecyl mercaptan, the chloroprene being added gradually with active stirring and in the absence of oxygen. The polymerization is allowed to proceed for about 20 hours in a closed reactor under conditions of cooling to maintain the temperature at about 20° C. The resulting synthetic latex has excellent stability and fluidity and exhibits little tendency to foam upon agitation.

Substantially similar results are obtained when the following materials are employed in place of a part of the chloroprene: styrene, acrylonitrile and methacrylonitrile.

EXAMPLE XII

Vinyl acetate/2-ethylhexyl acrylate monomers are polymerized to a low-foaming latex from the following ingredients employing the procedure of Example VIII:

| Components | Parts by Weight |
| --- | --- |
| Vinyl acetate | 90 |
| 2-ethylhexyl acrylate (containing 50 ppm hydroquinone) | 10 |
| Sodium bicarbonate (as 1% aqueous solution) | 10 |
| Potassium persulfate (as 1% aqueous solution) | 30 |
| Potassium 2-acetoxy-4-oxa-octacosanesulfonate | 5 |
| Water | 70 |

Excellent low-foaming latices can by a substantially similar process be prepared from the following monomer mixtures: vinyl acetate/ethyl acrylate, vinyl acetate/dibutyl maleate, vinyl acetate/methyl acrylate/acrylic acid, vinyl acetate/ethyl acrylate/methacrylic acid, vinyl acetate/methyl acrylate/itaconic acid, vinyl acetate/acrylamide and vinyl acetate/methylol acrylamide.

EXAMPLE XIII

A low-foaming styrene synthetic latex is prepared from the following materials:

| Components | Parts by Weight |
| --- | --- |
| Styrene | 135 |
| Sodium 2-acetoxy-4-oxa-eicosanesulfonate | 4 |
| Potassium persulfate | 0.4 |
| Water (deionized) | 210 |

The emulsifier is dissolved in about 90 percent of the deionized water and charged into a suitable reaction vessel. The reaction vessel is brought to reaction temperature, 60° C., and the styrene is added with agitation. A solution of potassium persulfate in the remaining amount of water is added at a uniform rate during the first 20 minutes of the polymerization. The reactor is cooled to approximately 25° C. and the reaction is terminated after 2 hours. A very low order of foam formation is observed during the polymerization. The latex is filtered through an 80 mesh stainless steel screen to remove any coagulum from the resulting polymer. A latex produces little foam upon vigorous agitation.

Synthetic latices of 50 percent solids content were prepared from butyl acrylate and methyl methacrylate according to the procedure of Example V except that commercially available emulsion polymerization surfactants were substituted for the 2-acetoxy-4-oxa-docosanesulfonate of Example V. The commercial polymerization surfactants employed were Surfactant A (sodium salts of sulfated and ethoxylated alcohols), Surfactant B (sodium salts of sulfated and ethoxylated alcohols), Surfactant C (sodium dihexyl sulfosuccinate), Surfactant D (sodium diamyl sulfosuccinate), and Surfactant E (tetrasodium N-(1,2-dicarboxyethyl)-N-octadecyl sulfosuccinamate). Each surfactant was employed in an amount by weight of 5 parts per hundred of monomer (5 phm). The resulting synthetic latices were evaluated according to the following procedures and compared with the latices of Examples IV and V, the results being tabulated in Table 1.

FOAMING AND MECHANICAL STABILITY TEST

A 50-g. sample of 50 percent total solids-containing latex is placed into an approximately 500-ml. glass container. The stirred shaft to which is affixed a small diameter disk is immersed close to the bottom of the container and mixed for 30 minutes at a speed of about 14,000 rpm. The latex after completion of the test is filtered to collect any coagulum formed as a result of the test. The coagulum is rinsed gently with distilled water, dried and the amount of coagulum weighed.

The foaming tendency of the latex is evaluated by noting the volume of latex and foam after the 30 minute period of agitation at 14,000 rpm as hereinbefore described and comparing this volume with the initial volume prior to stirring. A low-foaming synthetic latex produces a 10 percent or less increase in volume under the conditions of this test. A medium-foaming latex produces an increase of about 50 percent, while a high-foaming latex produces a volume increase of about 75 percent or more. A non-foaming latex as used herein is substantially free of foam and produces a volume increase of less than about 2 percent.

TABLE 1

| Surfactant | Foaming | Reactor Coagulum | Mechanical Stability |
| --- | --- | --- | --- |
| | | | (% Coagulum formed) |
| Example IV* | None | 0.1 | 1 |
| Example V | None | 0.4 | 2 |
| Surfactant A | High | 1.3 | 18 |
| Surfactant B | Medium | 3.5 | 5 |
| Surfactant C | High | 0.3 | 21 |
| Surfactant D | High | 0.6 | 37 |
| Surfactant E | Medium | 0.6 | 10 |
| Surfactant | | | |

*6 parts emulsion polymerization surfactant per hundred of monomer.

As can be determined from Table 1, the latices of Examples IV and V exhibited excellent mechanical stability and non-foaming properties. Synthetic latices prepared from the emulsion polymerization surfactants of the present invention exhibit a balance of desirable properties, particularly with respect to their tendencies to produce low orders of foam during polymerization and subsequent to their preparation by vigorous shaking and agitation.

EXAMPLE XIV

A dry-cleaning composition suitable for the cleaning of cotton, woolens and most synthetic textiles is prepared by dissolving the compound of Example I in perchloroethylene in an amount of 0.25 percent by weight of the solution. This solution when agitated for 30 minutes with artificially soiled swatches followed by rinsing with perchloroethylene, drying and grading for soil removal resulted in 56 percent soil-removal on cotton swatches, and 65 percent soil-removal from soiled Dacron swatches.

Substantially similar results can be obtained when the following 2-acetoxy-4-oxa-alkanesulfonates are employed in lieu of the compound of Example XII in that efficient dry-cleaning properties are observed: sodium 2-acetoxy-4-oxa-tetradecanesulfonate; potassium 2-acetoxy-4-oxa-hexadecanesulfonate; sodium 2-acetoxy-4-oxa-octadecanesulfonate; potassium 2-acetoxy-4-oxa-nonadecanesulfonate; lithium 2-acetoxy-4-oxa-eicosanesulfonate; sodium 2-acetoxy-4-oxa-uncosanesulfonate; ammonium 2-acetoxy-4-oxa-docosanesulfonate; sodium 2-acetoxy-4-oxa-tricosanesulfonate; dimethylammonium 2-acetoxy-4-oxa-tetracosanesulfonate; potassium 2-acetoxy-4-oxa-pentacosanesulfonate; dimethylpiperdinium 2-acetoxy-4-oxa-hexacosanesulfonate; sodium 2-acetoxy-4-oxa-eicosanesulfonate; potassium-2-acetoxy-4-oxadocosanesulfonate; sodium 2-acetoxy-4-oxa-tetracosane-sulfonate; and isomers thereof.

EXAMPLE XV

A detergent composition providing excellent cleaning formost textile materials has the following formula:

| Components | Parts by Weight |
| --- | --- |
| Sodium 2-acetoxy-4-oxa-eicosanesulfonate | 17.5 |
| Sodium sulfate | 23 |
| Sodium tripolyphosphate | 50 |
| Sodium silicate | 6 |
| Water | 3.5 |

The product of Example I likewise provides efficient cleaning properties and was evaluated for detergency by washing naturally soiled white dress shirts. Shirts were worn by male subjects under ordinary conditions for 2 normal working days. The degree to which a detergent composition containing a detergent compound to be tested cleaned the collars and cuffs of the soiled shirts, relative to the cleaning degree of a similar composition containing a standard detergent compound was considered a measure of the detergency effectiveness of the test compound.

The washing solution used in the test contained 0.02 percent of the organic surface active agent of Example I and 0.05 percent sodium tripolyphosphate. No fluorescers or bleaches or anti-redeposition agents were used. The pH of the washing solution was 10 and water of 5 grains per gallon hardness was used. A conventional, agitator-type washer was used. The detergent compounds in the standard detergent composition was sodium tallow alkyl sulfate, a commonly used organic detergent compound in heavy-duty laundry detergent compositions. The test detergent composition contained the detergent compound to be tested, i.e., product of Example I.

Under these conditions the detergency effectiveness of the product of Example I in wash water of 80° F. was indistinguishable from that of the sodium tallow alkyl sulfate-containing standard composition. Desirable cleaning was also obtained at 130° F. Thus, the product of Example I shows desirable levels of cleaning when employed as a detergent active in the preparation of detergent compositions.

What is claimed is:

1. A low-forming aqueous synthetic latex composition comprising a polymer of at least one vinylic monomer and an amount, sufficient to effect emulsion polymerization of said monomer, of a 2-acetoxy-4-oxa-alkanesulfonate polymerization surfactant having the formula

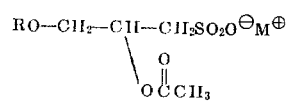

wherein R is alkyl of about 10 to about 22 carbon atoms and $M^+$ is a salt-forming radical selected from the group consisting of alkali metal, ammonium and substituted ammonium cations.

2. The synthetic latex of claim 1 wherein the amount of 2-acetoxy-4-oxa-alkanesulfonate is about 0.5 to about 5 percent by weight of the vinylic monomer employed in emulsion polymerization.

3. The synthetic latex of claim 2 wherein R is alkyl of about 12 to about 18 carbon atoms.

4. The synthetic latex of claim 3 wherein $M^+$ is alkali metal.

5. The synthetic latex of claim 4 wherein the polymer is a homopolymer of styrene.

6. The synthetic latex of claim 4 wherein the polymer is a homopolymer of vinyl chloride.

7. The synthetic latex of claim 4 wherein the polymer is a copolymer of styrene and butadiene.

8. The synthetic latex of claim 4 wherein the polymer is a copolymer of butyl acrylate and methyl methacrylate.

* * * * *